United States Patent [19]

Ossona de Mendez et al.

[11] E Re. 30,845

[45] Reissued Jan. 12, 1982

[54] APPARATUS FOR AUTOMATICALLY MEASURING THE LIGHT TRANSMISSION FACTOR OR LIQUID TEST SAMPLES

[75] Inventors: Michel Ossona de Mendez, Montlhery; Michel J. Dupuy, Livry-Gargan; Roland Charreton, Paris; Albert Foucard, Gagny, all of France

[73] Assignee: Roussel-Uclaf, Romainville, France

[21] Appl. No.: 971,563

[22] Filed: Dec. 20, 1978

Related U.S. Patent Documents

Reissue of:

[64] Patent No.: 3,829,221
Issued: Aug. 13, 1974
Appl. No.: 335,890
Filed: Feb. 26, 1973

[30] Foreign Application Priority Data

Feb. 29, 1972 [FR] France ..... 72.6802

[51] Int. Cl.[3] ..... G01N 21/13; G01J 3/42

[52] U.S. Cl. ..... 356/440; 356/409

[58] Field of Search ..... 356/409, 410, 414, 432, 356/436, 440; 250/573

[56] References Cited

U.S. PATENT DOCUMENTS

| | | | |
|---|---|---|---|
| 3,322,958 | 5/1967 | Heiss | 250/573 |
| 3,377,467 | 4/1968 | Staunton et al. | 356/402 |
| 3,401,591 | 9/1968 | Anthon | 356/36 |
| 3,489,525 | 1/1970 | Natelson | 356/39 |
| 3,554,654 | 1/1971 | Paatzsch et al. | 356/409 |
| 3,567,393 | 3/1971 | Welch | 356/416 |
| 3,609,047 | 9/1971 | Marlow | 356/419 |
| 3,617,222 | 11/1971 | Matte | 356/427 |
| 3,619,073 | 11/1971 | De Mendez et al. | 356/246 |
| 3,619,624 | 11/1971 | Sorenson | 356/343 |
| 3,622,279 | 11/1971 | Moran | 356/246 |
| 3,656,116 | 4/1972 | Jansen, Jr. | 250/573 |
| 3,711,206 | 1/1973 | Moran | 356/434 |

FOREIGN PATENT DOCUMENTS

| | | | |
|---|---|---|---|
| 718434 | 4/1942 | Fed. Rep. of Germany | 356/434 |
| 1929169 | 12/1970 | Fed. Rep. of Germany . | |
| 1375748 | 9/1964 | France | 356/432 |
| 46-29555 | 6/1971 | Japan . | |
| 905301 | 9/1962 | United Kingdom . | |
| 1192008 | 5/1970 | United Kingdom . | |
| 1250218 | 10/1971 | United Kingdom . | |
| 1319483 | 6/1973 | United Kingdom . | |

OTHER PUBLICATIONS

"Analytical Biochemistry", 28, pp. 545-562, (1969), Anderson.

*Primary Examiner*—Vincent P. McGraw
*Attorney, Agent, or Firm*—Bacon & Thomas

[57] ABSTRACT

An apparatus for automatically measuring the light transmission factor of liquid test samples in which a number of transparent vats is arranged around the circumference of a stationary table over which rotates a photoelectric measuring device which successively scans each vat to determine the light transmission factor of the samples. The various samples are automatically transferred by sucking them into the measuring vats from a bank of test tubes via a bank of probes with flexible hose connections to each vat; a central control valve drains the vats after testing. Electronic timing circuits provide the control commands for the operative sequences of the device, and logic circuitry, in combination with a data storage and retrieval system, provides comparative data between reference measurements and sample measurements for each vat.

35 Claims, 6 Drawing Figures

APPARATUS FOR AUTOMATICALLY MEASURING THE LIGHT TRANSMISSION FACTOR OR LIQUID TEST SAMPLES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to light transmission measuring devices, and in particular to devices which are capable of automatically measuring the light transmission factor of succession of liquid test samples, such as cultures of micro-organisms, for example cultures and the like, and of interpreting and storing the test results.

2. Description of the Prior Art

The measurement of the light transmission factor of certain test samples is an important parameter in the comparison of liquid microorganic cultures. In the past, such measurements were obtained by means of devices which included a sampling vat, or measuring vat, into which the various liquid test samples were introduced successively for measurement. In some instances, a limited number of separate measuring vats was used.

For large laboratories, which had to examine a large number of liquid test samples, it was therefore necessary to have several of these devices which had to be operated by a corresponding number of personnel. Such a situation can result in a very costly testing operation, and it also increases the risk of errors which have potentially grave consequences, especially in the pharmaceutic industry.

SUMMARY OF THE INVENTION

It is a primary objective of the present invention to overcome the aforementioned shortcominings, by suggesting an apparatus for the automatic measurement of the light transmission factor of a large number of liquid test samples in a reliable, high-speed procedure which also permits the convenient interpretation and storage of the test results obtained.

The invention proposes to attain the above objective by suggesting an apparatus for automatically measuring the light transmission factor of liquid test samples which is characterized in that it includes a series of transparent measuring vats which are arranged at regular intervals along a circumference, each vat being designed to receive a liquid test sample, the apparatus further including a means for simultaneously introducing a separate sample into each measuring vat and for simultaneously draining these samples from all measuring vats, a means for successively measuring the light transmission factor of each sample in its measuring vat and for furnishing an electronic signal indicative of the coefficient of light transmission of each liquid sample, a means for processing and recording these signals, and a means for controlling the timing sequence of the sample transfer operation, of the sample draining operation, and of the measuring operation.

In a preferred embodiment of the invention, the sample transfer means and sample draining means include a separate suction probe for each mesuring vat, connected thereto by a flexible hose, and a vertically movable platform under the bank of probes, the platform being arranged to receive a matching bank of test tubes which contain the various samples of culture liquid to be tested. The suction probes thus have the same spacing as the test tubes on the platform, so that when the latter is raised against the suction probes, and a negative pressure is applied to the measuring vats via a central control valve, each separate liquid sample is drawn into its corresponding measuring vat. During this transfer procedure and during the subsequent sequential measurement of each vat contents, the various liquid test samples remain isolated from each other. Following termination of the measurements, the test samples are simultaneously drained from the measuring vats through another operation of the central control valve, whereby all test liquid samples are collected inside a tank prior to final disposal.

A preferred embodiment of the invention further suggests an apparatus which includes a rotating platform whose rotary axis is the center of the circumference on which the measuring vats are charged. The rotating platform of the apparatus includes a bridge which straddles the measuring vats on the circumference of the stationary table, the bridge carrying a light source and an optical measuring system facing the light source on the other side of the measuring vats. The light which travels from the light source through the transparent walls of the measuring vat is transmitted to a photosensitive device and interperted in the form of an electronic signal, the signal being transmitted to a stationary electronic signal treatment and interpretation unit over rotary contacts on the indexing table.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows.

DESCRIPTION OF THE PREFERRED EMBODIMENT

Figure 1:
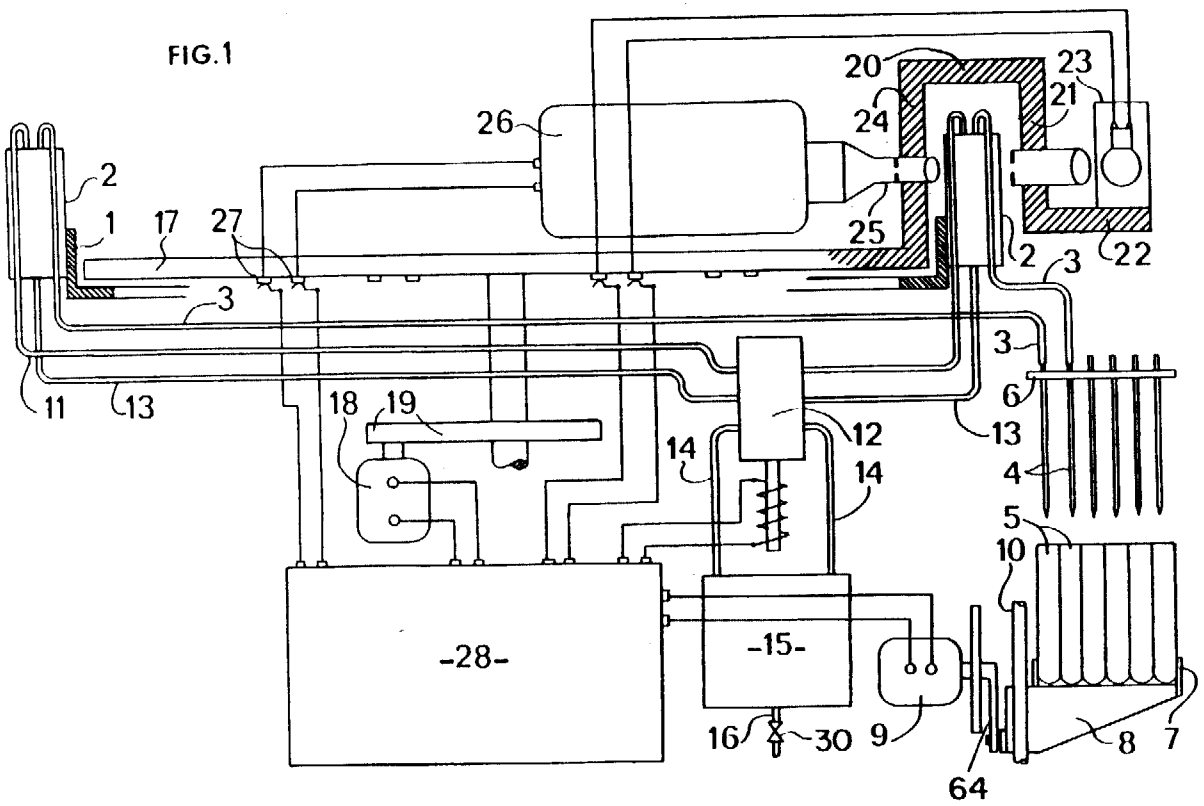
FIG. 1 is a schematic elevational representation of an apparatus for automatically measuring the light transmission factor of liquid test samples, embodying the invention.

Referring to FIG. 1, the apparatus of the invention includes a circular stationary table 1, and mounted on the periphery of this table a plurality of regularly spaced measuring vats 2 with transparent side walls. These measuring vats may be of the kind described in French Pat. No. 1,538,351, which discloses a sampling vat designed for automatic transfer and removal of the contents.

Each vat 2 is connected by a flexible transfer hose 3 to a transfer probe 4 in the form of a small, pipette-like tube. The probe 4 operates in the manner of a hypordermic needle, after introducton into a test tube 5 containing the liquid sample to be studied.

Figure 4:
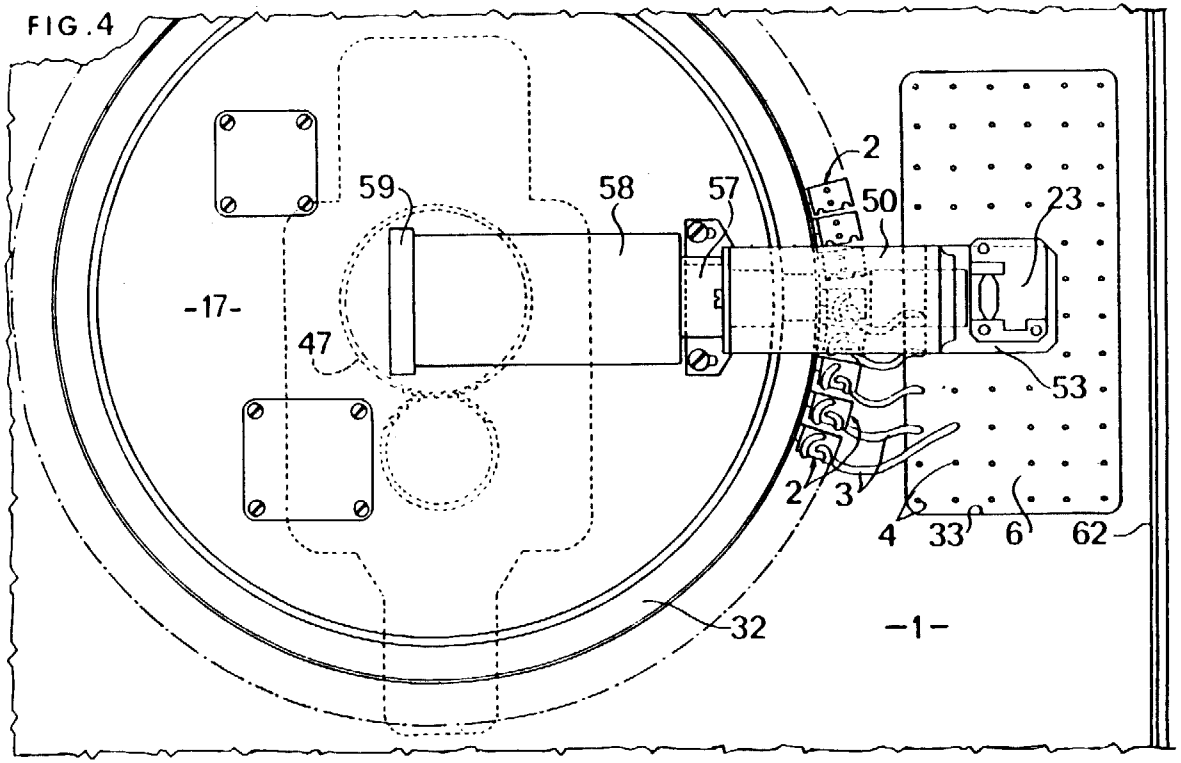
FIG. 4 shows the machine of FIG. 2 in a plan view.

The probes 4 are arranged in a regularly patterned bank on a rectangular support plate 6 (FIG. 4), the latter carrying parallel rows of regularly spaced probes 4 in vertical alignment with a similar bank of test tubes 5 arranged on a platform 7 which is part of a support bracket 8. The latter is arranged for vertical motion along vertical guides 10, being driven by an electric motor 9 and a crank drive 64.

The bracket 8 thus moves between a lower position, in which the probes 4 are above and outside the test tubes 5, and a upper position in which the test tubes 5 are penetrated by the transfer probes 4.

The apparatus of the invention contains an equal number of measuring vats 2 and transfer probes 4. Each vat 2 is also individually linked to a flexible suction hose 11 which can be connected to a common source of negative pressure (not shown in the drawing) and which, when connected thereto, creates a suction effect in the vat, thereby drawing the test sample from their test tubes 5, via the probes 4 and transfer hoses 3, into the respective measuring vats 2. A flexible drain hose 13 links each measuring vat 2 to a common control valve 12, through which the liquid samples can be emptied simultaneously via two lines 14 into a drain tank 15. The contents of tank 15 can be drained through a pipe 16 and a drain valve 30 into a drain (not shown). The central control valve 12 may be either a rotary valve with several control positions, or a solenoid-operated valve which is arranged to perform the following operations:

a. The simultaneous connection of all measuring vats 2 to a common source of negative pressure which causes the various test samples to be drawn into their respective vats 2;

b. The separation of the measuring vats 2 from the drain tank 15 and from each other so as to retain the liquid samples in their vats during the entire measuring operation; and c. The simultaneous connection of all the vats 2 with drain tank 15 for the draining of their contents into the tank 15.

The function of the drain valve of waste tank 15 may also be incorporated in the function of the central control valve 12.

Above table 1 is arranged a rotary platform 17 which is driven by an electric motor 18 via a reduction gear 19. The rotary platform 17 carries on its periphery a bridge 20 in the form of an inverted "U" which is so arranged that it passes over the successively positioned measuring vats 2, the vertical legs 21 and 24 of bridge 20 being positioned on opposite sides of the vat profile.

The outer vertical leg 21 of bridge 20 further includes a horizontal extension 22 on which is mounted a light source 23. On the inner leg 24 of bridge 20 is mounted a photosensitive device 25 which is arranged to receive the light bundle which is emitted by light source 23 and which has traversed the vat 2 and its contents. The photosensitive device 25 is connected to an electronic device 26 which transforms the signals from the photosensitive device 25 into easily processable electronic information data.

The electronic device 26 is further connected to an electronic control unit 28 which operates as a timing device and as an information storage device, the connecting lines including rotary contacts 27 arranged on the rotating platform 17.

Figure 2:
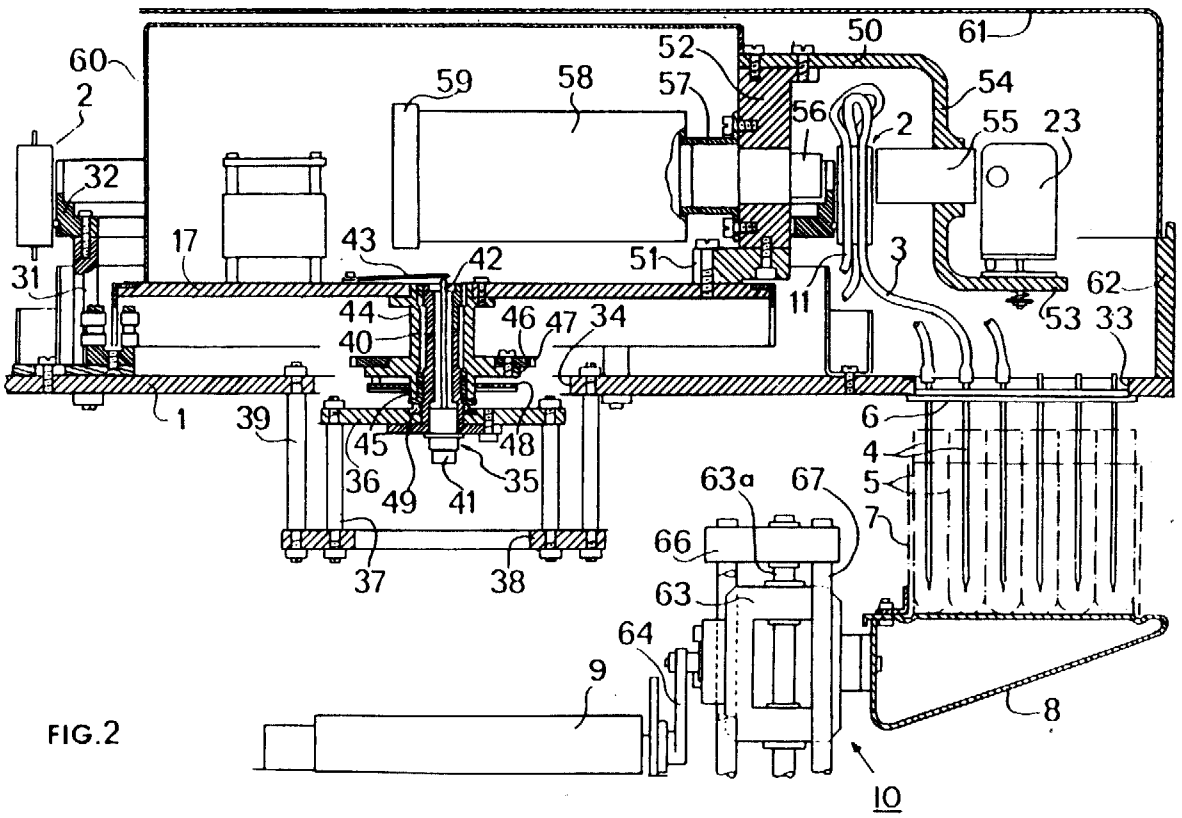
FIG. 2 shows in an elevational cross section the major mechanical components of the embodiment of FIG. 1.

The major portions of this apparatus are illustrated in more detail in FIG. 2. It shows the stationary support table 1 on which are mounted the measuring vats 2 and the rotary platform 17, as well as the bank of transfer probes 4. The measuring vats 2 are mounted at regular intervals on a ring profile 32 which in turn is supported on the stationary table 30 by means of spacers 31. Near the periphery of table 30 is further arranged an opening 33 in alignment with the vertically movable bracket 8, the opening 33 being of rectangular outline and carrying a matching support plate 6 for the withdrawal probes 4 of the apparatus. The vat-side ends of the flexible transfer hoses 3 linking each probe 4 to one of the measuring vats 2 and the flexible suction hoses 11 linking the measuring vats 2 to the common control valve 12, as shown in FIG. 1, are preferably embedded inside suitable lateral vertical grooves in the end walls of the vats 2 which are oriented perpendicularly to their transparent walls.

In the middle of support table 1 is further arranged a circular opening 34 through which extends a column assembly 35 which forms a vertical bearing support for the rotary platform 17. The column 35 is attached to a horizontal flange 36 which is supported by several studs 37 mounted in a second flange 38, which in turn is connected to the stationary support table 1 by means of studs 39. The flange 36 is traversed vertically by a hollow arbor 40 which is rigidly connected to the flange and on whose lower extremity is arranged an electrical connector plug 41. A conducting rod 42 extends through the bore of arbor 40 so as to link the plug 41 with a contact blade 43 arranged above the rotary table 17. To the blade 43 is connected a lead which supplies electric power to the devices mounted on the rotating platform 17.

The stationary arbor 40 is surrounded by a bearing sleeve 44 which is attached to the lower side of platform 17. Insulating sleeves between the arbor 40 and the bearing sleeve 44 serve as radial bearing guides. The bearing sleeve 44 is further provided with a flange portion 36 which carries a spur gear ring 47 whose teeth are engaged by a pinion mounted on the drive shaft of an electric motor 18 (FIG. 1) which serves to drive the rotary platform 17. Underneath the flange portion 46 is attached a printed circuit panel 48. The bearing sleeve 44, and the platform 17 supported by it, are in turn supported vertically on the flange 36 by means of a ball thrust bearing 49.

The bridge 20, which is mounted on the rotating platform 17 and indicated schematically in FIG. 1 as an extension thereof, includes an offset support arm 50 which is attached to the platform by means of an intermediate base block 51 and a vertical support block 52. The support arm 50 further includes a horizontal extension 53 on which is mounted a light source 23. The latter is preferably a quartz-iodine lamp.

In the vertical portion 54 of support arm 50 is mounted an optical system 55 whose purpose is to align the light bundle emitted by light source 23 in the direction of the measuring vats 2. In the supporting block 52 is similarly mounted another optical system 56 which is arranged to condense the light bundle passing through the measuring vat 2 into a suitable beam which can be measured by a photoelectric cell. The support block 52 further carries on its side facing away from the measuring vats 2 a photoelectric cell 58 which is supported by a mounting sleeve 57. This photoelectric cell may be a vacuum cell of the "Boutry"-type which converts the light beam received through the measuring vats 2 into an electrical signal. To the output side of the photoelectric cell 58 is connected an amplifier-discriminator device 59 which transforms the signals received from the cell 58 into easily transmissible electrical signals.

The devices mounted on the rotating platform 17 are protected by a cover 60, while a second protective cover 16 is fixedly mounted on vertical supports such as the support profile 61 which is attached to the stationary table 1.

The vertically movable bracket 8 which carries the bank of test tubes 5 containing the samples to be measured is mounted on one side of a gliding hub 63 which is vertically movable along parallel vertical guide blocks 63a. It receives its vertical movement through a crank 64 which is mounted on the drive shaft of an electric motor 9.

Figure 3:
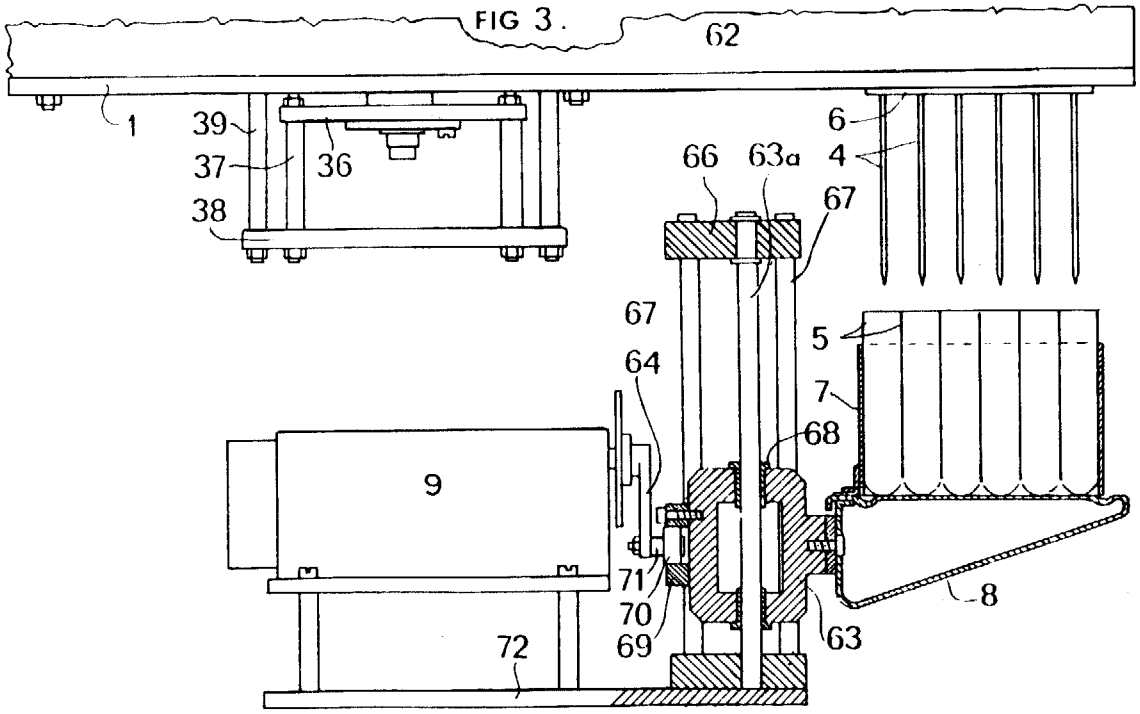
FIG. 3 shows the lower portion of the machine of FIG. 2 in a different operating position.

FIG. 3 shows a detail cross section of the arrangement of bracket 8 and its reciprocating drive, the guide rod 63a for the gliding hub 63 being shown between two support columns 67 which carry an upper end plate 66. The gliding hub 63 is supported on the vertical guide rod 63a by means of two bushings 68 which may be in the form of ball bushings. To the end of crank 64 is attached a follower 70 supported by a short arbor 71, the follower 70 engaging a horizontal guide 69 on the gliding hub 63. The electric motor 95, as well as th columns 67 and 63a which support and guide the movable bracket 8, are mounted on a base plate 72.

Figure 5:
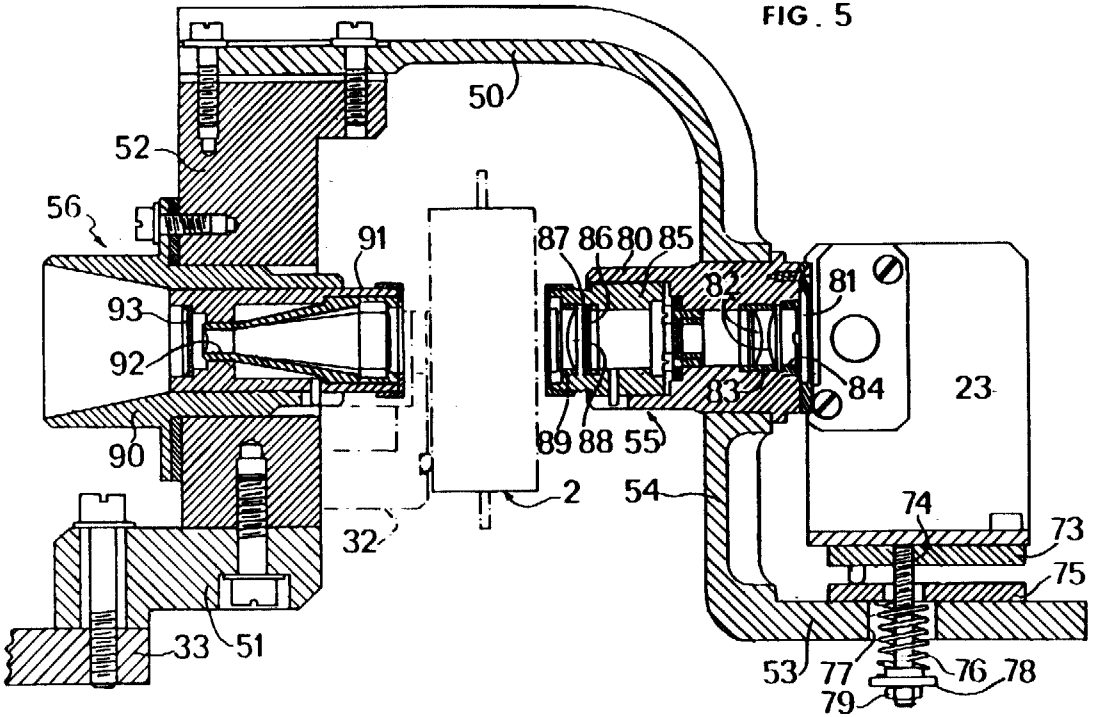
FIG. 5 shows an enlarged cross sectional detail representing the measuring bridge of the embodiment of FIG. 2.

The bridge, which is constituted by the vertical support 52 and the offset support arm 50, is shown in more detail in FIG. 5. It shows how the light source 23 is mounted on the horizontal extension 53 of support arm 50 in connection with an adjustment means which includes a horizontal plate 73 on which rests the light source 23 itself, and into which is screwed a threaded rod 74 which passes through the counter plate 75 on the upper side of the horizontal extension 53 of support arm 50. On the rod 72 is arranged a compression spring 76 which is received inside an opening 77 in the horizontal extension 53 and which bears against the counter plate 75 and against a washer 78 which is retained on rod 74 by means of a nut 79.

The optical system 55 which is mounted in the vertical portion of support arm 50 includes a housing 80 which holdes a heat-restraining glass 81 facing the light source 23 and two plano-convex lenses 82 which are mounted inside a mounting sleeve 83, the latter being retained in the center bore of housing 80 by means of a threaded ring 84. Also arranged inside housing 80, on the side facing toward the measuring vats 2, is an adjustable head 85 which carries an optical filter 86, a diaphragm 87, and a plano-convex lense 88 which is held by a threaded end ring 89.

The second optical system 56 which is supported by the vertical support 52 is aligned with the first optical system 55 at the opposite of the vat profile. It includes a housing 90 inside which is movably arranged an optical support 91. The optical support 91 holds a fiber optical assembly 92 which condenses the light bundle received from the measuring vat into a narrower light beam. Opposite the smaller outlet end of the fiber optical assembly 92 is positioned an optical filter 93.

The photosensitive cell 58 which is placed at the exit side of the optical system 56 may for example be a vacuum cell of the "Boutry"-type. This device is known and therefore not further described here. The same applies to the amplifier-discriminator device 59 which is likewise of a known, conventional design.

Figure 6:
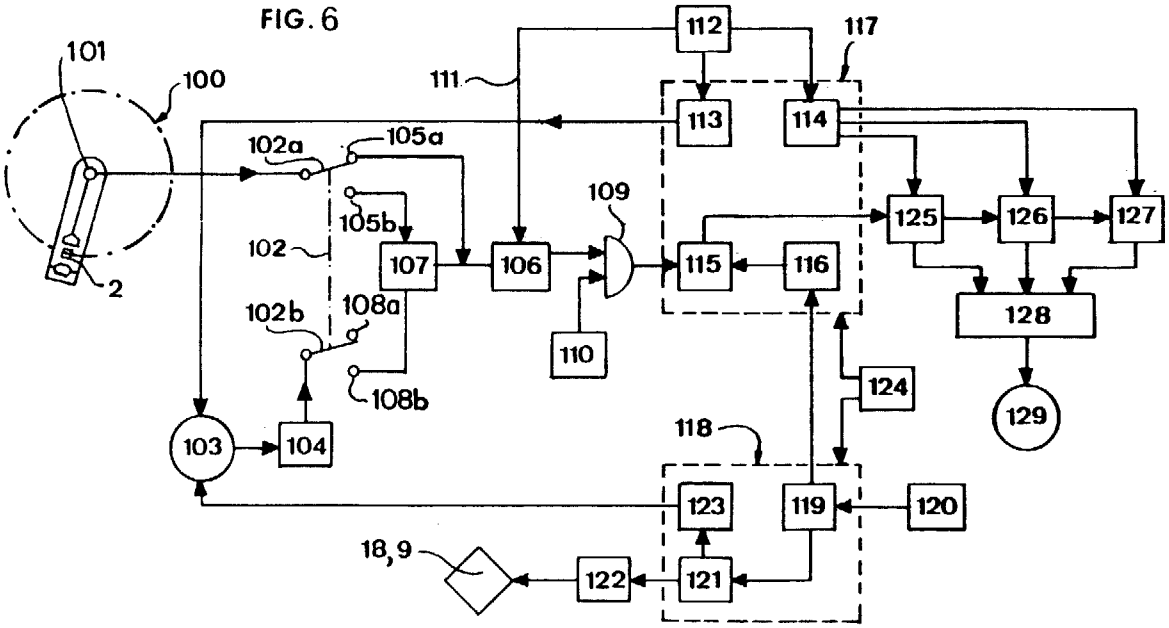
FIG. 6 is a logic diagram of the controls of the machine of the invention, as represented by the embodiment of FIGS. 1 and 2.

According to a preferred embodiment of the invention, the operative control of the apparatus shown in FIGS. 1–5 is provided by means of a control unit 28, which is shown in FIG. 1 and whose function is explained in more detailed by the operation diagram of FIG. 6. In that figure, the scanning apparatus, which includes the measuring vats 2 of the rotating platform 17, is indicated at reference numeral 100.

The rotary contact 101 of the scanning device is connected to the contact blade 102a of a two-way switch 102 which has two coupled contact blades 102a and 102b, the contact blade 102b being connected to the exit side of a reference value reader 103, via an intermediate converter 104. The device 103 may be a punched tape reader.

The movable contact 102a cooperates with two fixed contacts 105a and 105b. Contact 105a is connected directly to the entrance of a signal-to-time converter 106, while contact 105b is connected to converter 106 via an intermediate circuit 107 which compares a reference or calibration value with the value actually measured on a sample by scanning device 100 to produce a quotient or difference signal. The movable contact 102b cooperates with two fixed contacts 108a and 108b, but only contact 108b connecting the converter 104 to circuit 107 is used. The converter 106 includes an entry 111 to which is connected a circuit 112 from which it receives a control signal for the measurement of each vat.

The circuit 112 is also connected to a circuit 113 which controls the advance of the punched tape in the reference value reader 103, and to authorization circuit 114 which controls the registration of the measurement data. The exit of converter 106 is connected to the entrance of a pulse counter 115 over an intermediate AND-gate 109 whose second entrance is connected to a pulse generator 110. A second entrance of counter 115 is connected to a count authorization circuit 116. The control circuit 113, the authorization circuit 114, the counter 115, and the authorization circuit 116 constitute the logic counting unit 117 of the apparatus.

The authorization circuit 116 is connected to another logic unit 118 which controls the mechanical operations of the apparatus. It includes a position verifying device 119 responding to the positions of the central valve 12 (FIG. 1) and of the vertically moving bracket 8, the position verifying device 119 being controlled by a pulse generator 120 which produces a control signal during each revolution of the rotating platform 17. The position verifying device 119 is connected to an authorization circuit 121 which serves to initiate the functions of transferring the liquid samples into the measuring vats 2, of tranquilizing the samples inside those vats, of measuring each vat, and lastly, of draining the samples from the vats.

The authorization circuit 121 is connected to a motion control device 122 which initiates the various movements of the apparatus and which is linked to the drive motors 9 and 18 for the rotating platform 17 and for the reciprocating bracket 8 (FIG. 1). Circuit 121 is further connected to a second control circuit 123 which controls the advance of the punched tape through the reference value reader 103. The logic units 117 and 118 are synchronized in their operation by means of a time piece 124.

The exit of pulse counter 115 is connected to a three-stage counting assembly 125, 126, 127 which counts, respectively, the units, tens, and hundreds and which is controlled by authorization circuit 114 for the data registration. The three counting stages 125, 126 and 127 are connected to a data storage control device 128 which in turn is connected to a data storage device which records the data received from the counters. The latter is preferably a tape punch.

The apparatus of the invention thus performs the following functions during the course of a measurement cycle:

1. Upward motion of the bracket 8 which carries the platform with the test tubes 5 containing each a liquid sample to be measured.
2. Transfer of each liquid sample from one of the test tubes 5 into a corresponding measuring vat 2.
3. Separation of the measuring vats 2 from one another and from the drain tank 15 (FIG. 1).
4. Measurement of the light transmission factor of each test sample.
5. Draining of the measuring vats 2.
6. Lowering of the bracket 8.
7. At the end of the cycle, preparation of the apparatus for a new cycle.
8. Draining of the drain tank 15, subject to the quantity of liquid contained in each set of test tubes 5 and to the capacity of the tank.

The rotating platform of the apparatus which has just been described is preferably advanced in a continuous rotary motion. Thus, the measurements are made "on the fly," at the moment the light source 23 and the associated optical systems 55 and 56 (FIG. 2) move past the measuring vat 2.

The various operations of a complete measurement cycle are controlled by the control logic of FIG. 6, and they are as follows:

Initially, the measuring vats 2 are filled with a control liquid and a series of reference measurements is performed during which the switch 102 of the logic of FIG. 6 has been placed so that the movable contact blades 102a and 102b are aligned with the fixed contacts 105a and 108a, respectively. Following conversion of the values obtained from the measurement of the reference liquid into numerical values by means of circuits 106, 115 and 125, 126, 127, these numerical signals, which represent reference or calibration values, are recorded by the tape punch 129, each value of each measurement being associated with the identification number of a vat 2. This punched tape is now placed into he reference value reader 103. The reference values thus obtained may be used as long as their validity is not subject to question.

Once the reference values have been obtained and recorded, one can proceed with the measurement of a series of specific samples, which is as follows:

Following transfer of the liquid samples into the measuring vats 2 and isolation of the individual measuring vats, the measurement cycle is initiated, while the switch 102 is in the position in which the fixed contacts 105b and 108b are connected. The circuit 107 now receives simultaneously the signal which is generated by a measurement operation on a vat containing a specific liquid sample and the reference signal for this same vat containing the reference liquid, the reference signal being received from the reference value reader 103 in synchronism with the rotation of the rotating platform 17. The reference signal is transmitted to circuit 107 through the intermediary of converter 104. At the exit of circuit 107 are obtained signals which correspond in each case to the ratio between the light transmission factor measured on a specific liquid sample contained in a vat 2 and the light transmission factor measured on the reference liquid which had been measured in this same vat.

The output signals of circuit 107 are then transformed by the amplitude-to-time converter 106 into time-referenced signals and transformed into pulse trains by means of the circuits 110 and 109, these pulse trains being then counted and recorded on a punched tape by means of tape punch 129. The punched tape thus obtained provides a convenient record of the relative light transmission coefficients of a great number of liquid culture samples.

Knowing the relationship between the light transmission coefficient and the evolutionary state of a sample, it is thus possible to quickly and conveniently study the results which are recorded on the punched tape, in order to obtain the necessary information. For the latter purpose, the punched tapes may be processed by a computer.

The logic device of FIG. 6 controls the various operations of the apparatus of the invention in the following manner:

The platform 17 is rotated by means of motor 18, a tray filled with test tubes 5, each containing a reference liquid, is placed on top of bracket 8 in its lower position, and the switch 102 is placed so as to connect the fixed contacts 105a and 108a.

The logic circuit 118, which now receives a start signal from an attendant-actuated signal source (not shown), initiates the operation of motor 65 (FIG. 2) through the action of control circuit 122. As a result of the rotation of motor 9, the reciprocating bracket 8 is raised by means of the crank 64 and the gliding hub 62 to which it is attached, into the upper position (FIG. 2) in which the withdrawal probes 4 are dipped into their respective test tubes 5.

The circuit 119 now proceeds to identify the position of control valve 12, sending a corresponding signal to the authorization circuit 121 which in turn transmits to control circuit 122 an order to proceed with the movement of valve 12 (FIG. 1) into a position in which the measuring vats 2 are placed in connection with a source of negative pressure (not shown). This signal is transmitted to the electromagnetic control device of the central valve 12 which is shown schematically in FIG. 1. As soon as control valve 12 has been moved to that position, verifying circuit 119 identifies the new position of valve 12, whereupon the circuit 121 produces a signal initiating the transfer of the liquid from the test tubes into the measuring vats 2, by starting the device which produces the negative pressure.

At the end of the predetermined transfer time, the device producing the negative pressure is cut off and the logic assembly 118 moves the central valve 112 to a position in which the individual measuring vats are separated from each other as well as from the drain tank 15. The vats were previously communicating with drain tank 15, in order to let any excess liquid contained in the test tubes 5 flow through the vat into the drain tank, thereby also providing a certain degree of automatic rinsing of the vats 2.

Following a time period during which the liquid is allowed to settle in the measuring vats, the circuit 121 gives a measurement authorization signal, the measurement itself being initiated by the generator 120 which gives a timed signal at the moment when the platform 17 is positioned in alignment with the measuring vat 2, assuming that the latter is vat No. 1 of the series.

The measurement authorization signal initiates the transmission of electronic signals from the photosensitive device 58 to the amplifier 59 which is mounted on platform 17, and from there, via the rotary contacts 27, to the stationary part of the apparatus. The signals are received by the amplitude-to-time converter 106 which also receives a measurement control signal from circuit 112 for the successive measurement of each vat. The pulse generator 110 and the AND-gate 108 treat the output of converter 106 in such a way that a pulse train is obtained for each measurement which has a timing sequence as given by generator 110, the separation intervals being determined by the control signals generated by circuit 112 for vat-by-vat measurement. These pulse trains are then transmitted to the pulse counter 115 in the logic unit 117, which receives a count authorization signal form circuit 116, the latter having been initiated by the position verifying circuit 119 of logic unit 118.

The pulses counted by counter 115 are not transmitted to the three-stage counter 125, 126, 127 and are stored in this counter until the end of the measuring operation. The measurement termination signal is produced by circuit 112, and sent to the data recording authorization circuit 114 which initiates the transfer of the data stored in counters 126, 126, 127 to the tape punch 129 which has been started by circuit 128.

The end result of this operation is a punched tape on which are recorded the reference or calibration values associated with each separate measuring vat 2. The entire series of measuring operations is performed during one single revolution of platform 17 so that, when the latter is again in alignment with measuring vat No. 1, the circuit 120 sends a new signal to circuit 119 which in turn initiates, as previously, the interruption of the measuring operation, the lowering of the bracket 8, and the movement of central valve 12 in the position where the measuring vats are open to the drain tank (FIG. 1).

The punched tape obtained from punch 129 is now placed on the reference value reading device 103, the switch 102 is placed in contact with leads 105b and 108b, and the apparatus is ready to perform a new series of measurements on a set of specific test samples. The operations of transfer and settling of the liquid samples in the measuring vats 2 are performed in the same manner as previously and are therefore not described again.

On the other hand, however, the measuring operation is now accompanied by a simultaneous comparison with the reference values which have been recorded on the punched tape and which are read by reading device 103.

For this purpose, a control signal from authorization circuit 121 is issued shortly before the transmission of the first measurement from the mechanical assembly of the apparatus, the control signal being sent to control circuit 123 which initiates the start up of reader 103, which then runs until it produces a first signal corresponding to the reference value of vat No. 1.

This signal is stored and converted by converter 104 and then applied to the comparator 107 which also receives the measurement signal from the corresponding first measuring vat 2. The reading operation of reader 103 is controlled for all further measuring and comparison operations by means of control circuit 113 under the action of pulse generator 112 which issues a control signal for the vat-by-vat measurement. The circuit 107 thus receives successive pairs of signals, one arriving from platform 17 and corresponding to the specific measurement made on a sample contained in a vat, while the other arrives from the punched tape which contains the reference measurement corresponding to that same measuring vat. The output signals of circuit 107 are now measured and stored on a punched tape in exactly the same manner as were the signals during the calibration measurement cycle described earlier.

The control device which has been described in reference to FIG. 1 is composed of conventional logic circuitry, and no detailed description is therefore given herein.

It can be seen from the above that the apparatus of this invention makes it possible to simultaneously perform a large number of measurements on liquid test samples, these measurements having previously been performed one by one. Thus, this apparatus affords a large saving in time and wages in comparison to prior art devices. It is furthermore possible to use the measuring results which are recorded on punched tape by feeding them into a computer.

It should be understood, on the other hand, that the apparatus itself, as shown in FIGS. 1–5, may also be controlled in a different manner. It is possible, for example, to use a computer in order to control both the sequence of operation in the apparatus, and the storing and interpretation of the measurements obtained. In this case, the analog voltages produced by the apparatus are directly supplied to the analog-digital converter of the computer which then makes it possible, among other advantages, to perform several successive measurements on each measuring vat and to compute an average measurement value for each of them.

Furthermore, in this case the storage of the reference voltages in the memory is automatic and the division between the reference values and the corresponding measurement values is obtained by a purely digital discrimination process. Also, the measuring cycle may start at any one of the measuring vats, the computer taking care of the automatic reclassification of the vats.

Finally, if a suitable computer program is used in connection with a computer of adequate memory capacity, the computer may be capable of also performing all the statistical operations which may be desired in connection with the interpretation of the measurements made by the apparatus.

In embodiment of the apparatus as described above the platform carries 72 measuring vats and the timing of the controls in such that these vats are measured in 10 seconds. A complete operative cycle thus lasts approximately 50 seconds, which includes the time necessary for the settling of the liquid samples inside the vats.

In the case where the use of a computer is considered for the control of the apparatus, it is for example possible to perform up to 16 measurements on each vat instead of a single one, the entire duration of an operative cycle being still maintained between 40 and 55 seconds.

It should be understood, of course, that the number of 72 measuring vats for the successive measurement of 72 liquid samples is only given by way of example, and that it would be easy to provide a similar apparatus with a much larger number of measuring vats based on the teachings of this disclosure.

What is claimed is:

1. An apparatus for measuring a series of liquid test samples for their light transmission characteristics comprising:

a. a stationary circular apparatus frame, b. a plurality of measuring vats disposed on said apparatus frame, c. a light source, d. light detecting means, e. means for supporting said light detecting means and said light source in alignment, [and] *said supporting means comprising:*

*i. a rotary platform journaled in the vertical central axis of said stationary apparatus frame,*

*ii. said rotary platform having means for aligning said light source and said light detecting means, said measuring vats positioned between said light source and said light detecting means for measuring the light transmission characteristics of said vats during rotation of said platform, and*

*iii. said aligning means directly connecting said light source and said light detecting means to said rotary platform in fixed, spaced-apart relationship with respect to one another, and* f. [means for moving said supporting means relative to said measuring vats, said measuring vats positioned between said light source and said light detecting means for measuring the light transmission characteristics of said vats] *means for rotating said platform relative to said apparatus frame during measurement of said light transmission characteristics.*

2. An apparatus as recited in claim 1 further comprising:

a. means for simultaneously filling all of said measuring vats to be tested with said liquid test samples.

3. An apparatus as recited in claim 2 wherein said means for simultaneously filling said measuring vats comprises:

a. a plurality of conduits, each conduit attached at one end to said vats, b. a plurality of transfer probes, one transfer probe attached at the other end of each conduit, c. a bank of sample receptacles for holding said test samples for transfer to said vats, d. means for positioning said plurality of transfer probes within said plurality of sample receptacles, and e. means for forcing said liquid test sample from said sample receptacles through said conduits and into said vats.

4. An apparatus as recited in claim 3 wherein said forcing means comprises:

a. a source of negative pressure, b. a control valve connected to the source of negative pressure, and c. a suction line connected between each vat and the control valve.

5. An apparatus as recited in claim 4 further comprising means for simultaneously draining all of said measuring vats.

6. An apparatus as recited in claim 5 wherein said draining means comprises:

a. a drain line connected between each vat and the control valve, b. a drain connected to the control valve, and c. means for operating the control valve so as to shift it between the following positions:

a rest position in which the drain lines are open to the drain, a first operating position in which the drain lines are blocked and the suction lines are simultaneously connected to the source of negative pressure, and a second operating position in which all of the suction lines and all the drain lines are individually blocked.

7. An apparatus as recited in claim 6 wherein said control valve is a multi-position rotary valve.

8. An apparatus as recited in claim 1 further comprising means for simultaneously draining all of said measuring vats.

9. An apparatus as recited in claim 8 wherein said draining means comprises:

a. a control valve, and b. a gravity drain line connecting the lower end of each vat to said control valve.

10. An apparatus as recited in claim 1 wherein said [supporting] *aligning* means comprises:

[a. a rotary platform journalled in the vertical central axis of said stationary apparatus frame,]

[b.] a bridge on the periphery of the rotary platform in the form of an inverted "U" and so arranged on the platform that the recess of the "U" at least partially encloses the vat profile,

[c.] said light source mounted on one side of the bridge, and

[d.] said light detecting means mounted on the other side of said bridge.

11. An apparatus as recited in claim 10 wherein said light source is mounted on said bridge exterior to the periphery of said rotary platform, and said light detecting means is connected to said rotary platform and positioned interior to the periphery thereof.

12. An apparatus as recited in claim 11 wherein said light detecting means comprises:

a. a photocell for generating electronic signals in response to light passing through said vats from said light source.

b. means for amplifying said electronic signals, and c. rotary electric contact means attached to said platform and connected to said amplifying means.

13. An apparatus as recited in claim 11 wherein said light detecting means further comprises light condensing means aligned between said photocell and said light source.

14. An apparatus as recited in claim 11 wherein said means for [moving] *rotating* said [supporting means] *platform* comprises means for continuously rotating said [supporting means] *platform.*

15. [Apparatus] *An apparatus* for measuring a series of liquid test samples for light transmission characteristics comprising:

a. a *stationary* circular apparatus frame, b. a plurality of measuring vats [positioned] *disposed* on said apparatus frame, c. a light source, d. light detecting means, e. means for supporting said light detecting means and said light source in alignment, *said supporting means comprising:*

*i. a rotary platform journaled in the vertical central axis of said stationary apparatus frame,*

*ii. said rotary platform having means for aligning said light source and said light detecting means, said measuring vats positioned between said light source and said light detecting means for measuring the*

*light transmission characteristics of said vats during rotation of said platform, and*

*iii. said aligning means directly connecting said light source and said light detecting means to said rotary platform in fixed, spaced-apart relationship with respect to one another, and* f. means for [effecting relative motion between the supporting means and the measuring vats, whereby said vats are aligned between said light source and said light detecting means during measurement,] *rotating said platform relative to said apparatus frame during measurement of said light transmission characteristics,* g. means for simultaneously filling all of said measuring vats, and h. means for simultaneously draining all of said measuring vats.

16. An apparatus as recited in claim 15 wherein said means for simultaneously filling all of said vats comprises:

a. a plurality of conduits each conduit attached at one end of said vats, b. a plurality of transfer probes, one transfer probe attached at the other end of each conduit, c. a bank of sample receptacles for holding said test samples for transfer to said vats, d. means for positioning said plurality of transfer probes within said plurality of sample receptacles, and e. means for forcing said liquid test sample from said sample receptacles through said conduits and into said vats.

17. An apparatus as recited in claim 16 wherein said forcing means comprises:

a. a source of negative pressure, b. a control valve connected to the source of negative pressure, and c. a suction line connected between each vat and the control valve.

18. An apparatus as recited in claim 17 wherein said draining means comprises:

a. a drain line connected between each vat and the control valve, b. a drain connected to the control valve, and c. means for operating the control valve so as to shift it between the following positions:

a rest position in which the drain lines are open to the drain, a first operating position in which the drain lines are blocked and the suction lines are simultaneously connected to the source of negative pressure, and a second operating position in which all of the suction lines and all the drain lines are individually blocked.

19. An apparatus as recited in claim 18 wherein said control valve is a multi-position rotary valve.

20. An apparatus as recited in claim 15 wherein said draining means comprises:

a. a control valve, and b. a gravity drain line connecting the lower end of each vat to said control valve.

[21. An apparatus as recited in claim 15 wherein said supporting means is movable and said apparatus frame is stationary.]

22. An apparatus as recited in claim [21] *15* wherein said supporting means comprises:

[a. a rotary platform journalled in the vertical central axis of said stationary apparatus frame,]

[b.] *a.* a bridge on the periphery of the rotary platform in the form of an inverted "U" and so arranged on the platform that the recess of the "U" at least partially encloses the vat profile,

[c.] *b.* said light source mounted on one side of the bridge, and other side of said bridge.

23. An apparatus as recited in claim 22 wherein said light source is mounted on said bridge exterior to the periphery of said rotary platform, and said light detecting means is connected to said rotary platform and positioned interior to the periphery thereof.

24. An apparatus for measuring a series of liquid test samples for their light transmission characteristics comprising:

a. a stationary circular apparatus frame, b. a plurality of measuring vats positioned in a circular locus near the periphery of said apparatus frame, c. an optical system comprising:

i. a first element comprising a light source, and ii. a second element comprising light detecting means and light condensing means, d. means for supporting said first and second elements in alignment, [one of said elements positioned exterior to the locus of said vats and the other element positioned interior to the locus of said vats, and] *said supporting means comprising:*

*i. a rotary platform journaled in the vertical central axis of said stationary frame;*

*ii. said rotary platform having means for aligning said light source and said light detecting and light condensing means, said measuring vats positioned between said light source and said light detecting and light condensing means for measuring the light transmission characteristics of said vats during rotation of said platform, and*

*iii. said aligning means directly connecting said light source and said light detecting and light condensing means to said rotary platform in fixed, spaced-apart relationship with respect to one another, and* e. means for [continuously moving said supporting means relative to said measuring vats, said measuring vats positioned between said light source and said light detecting means for measuring] *continuously rotating said platform relative to said apparatus frame during measurement of* said light transmission characteristics.

25. An apparatus as recited in claim 24 further comprising:

a. means for simultaneously filling all of said measuring vats to be tested with said liquid test samples.

26. An apparatus as recited in claim 25 wherein said means for simultaneously filling said measuring vats comprises:

a. a plurality of conduits, each conduit attached at one end to said vats, b. a plurality of transfer probes, one transfer probe attached at the other end of each conduit, c. a bank of sample receptacles for holding said test samples for transfer to said vats, d. means for positioning said plurality of transfer probes within said plurality of sample receptacles, and e. means for forcing said liquid test sample from said sample receptacles through said conduits and into said vats.

27. An apparatus as recited in claim 26 wherein said forcing means comprises:

a. a source of negative pressure, b. a control valve connected to the source of negative pressure, and c. a suction line connected between each vat and the control valve.

28. An apparatus as recited in claim 27 further comprising means for simultaneously draining all of said measuring vats.

29. An apparatus as recited in claim 28 wherein said draining means comprises:

a. a drain line connected between each vat and the control valve, b. a drain connected to the control valve, and c. means for operating the control valve c. means for operating the control valve so as to shift it between the following positions:

a rest position in which the drain lines are open to the drain, a first operating position in which the drain lines are blocked and the suction lines are simultaneously connected to the source of negative pressure, and a second operating position in which all of the suction lines and all the drain lines are individually blocked.

30. An apparatus as recited in claim 24 wherein said supporting means comprises:

[a. a rotary platform journalled in the vertical central axis of said stationary apparatus frame,]

[b.] *a.* a bridge on the periphery of the rotary platform in the form of an inverted "U" and so arranged on the platform that the recess of the "U" at least partially encloses the vat profile,

[c.] *b.* said light source mounted on one side of the bridge, and

[d.] *c.* said light detecting means mounted on the other said of said bridge.

31. An apparatus as recited in claim 30 wherein said light source is mounted on said bridge exterior to the periphery of said rotary platform, and said light detecting means is connected to said rotary platform and positioned interior to the periphery thereof.

*32. An apparatus as recited in claim 24 wherein said light condensing means comprises an optical fiber for directing light from the measuring vats to said light detecting means.*

*33. An apparatus as recited in claim 24 wherein said first element further comprises optical means for directing a light beam from said light source to said measuring vats.*

*34. An apparatus as recited in claim 29 wherein said means for positioning said transfer probes within said plurality of sample receptacles comprises means for supporting said sample receptacles below said transfer probes and motor means for moving said sample receptacle supporting means upwardly for positioning said transfer probes within said sample receptacles.*

*35. An apparatus as recited in claim 34 wherein there is one transfer probe and one sample receptacle corresponding to each measuring vat, all of said sample receptacles being supported on said sample receptacle supporting means for simultaneous vertical movement by said motor means.*

*36. An apparatus for measuring a series of liquid test samples for their light transmission characteristics comprising:*

*a. a stationary circular apparatus frame,*

*b. a plurality of measuring vats disposed on said apparatus frame,*

*c. means for filling all of said measuring vats to be tested with said liquid test samples,*

*d. means for draining all of said measuring vats,*

*e. a light source,*

*f. a light detecting means,*

*g. means for supporting said light detecting means and said light source in alignment, said supporting means comprising:*

*i. a rotary platform journaled in the vertical central axis of said stationary apparatus frame,*

*ii. said rotary platfrom having means for aligning said light source and said light detecting means, said measuring vats positioned between said light source and said light detecting means for measuring the light transmission characteristics of said vats during rotation of said platform, and*

*iii. said aligning means directly connecting said light source and said light detecting means to said rotary platform in fixed, spaced-apart relationship with respect to one another, and*

*h. means for moving said supporting means relative to said measuring vats whereby light emitted by said light source is received by said light detecting means after passing through said measuring vats for measuring the light transmission characteristics of said vats.*

* * * * *